(12) United States Patent
Olsson et al.

(10) Patent No.: US 9,712,194 B2
(45) Date of Patent: Jul. 18, 2017

(54) DISTORTION SUPPRESSION FOR WIRELESS TRANSMISSION

(71) Applicant: TELEFONAKTIEBOLAGET L M ERICSSON (PUBL), Stockholm (SE)

(72) Inventors: Bengt-Erik Olsson, Hovås (SE); Christina Larsson, Mölndal (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/895,795

(22) PCT Filed: Jun. 3, 2013

(86) PCT No.: PCT/EP2013/061361
§ 371 (c)(1),
(2) Date: Dec. 3, 2015

(87) PCT Pub. No.: WO2014/194928
PCT Pub. Date: Dec. 11, 2014

(65) Prior Publication Data
US 2016/0134313 A1 May 12, 2016

(51) Int. Cl.
| H03D 1/04 | (2006.01) |
| H04L 27/06 | (2006.01) |
| H04B 15/00 | (2006.01) |
| H04B 1/10 | (2006.01) |
| H04B 1/12 | (2006.01) |
| H04B 1/40 | (2015.01) |

(52) U.S. Cl.
CPC ........... H04B 1/1018 (2013.01); H04B 1/123 (2013.01); H04B 1/40 (2013.01)

(58) Field of Classification Search
USPC ....... 375/219, 220, 222, 269, 284, 285, 295, 375/316, 320, 322, 323, 324, 326, 329, 375/332, 334, 335, 338, 339, 340, 341, 375/342, 344, 346, 354, 356, 358, 362, 375/375
See application file for complete search history.

(56) References Cited

U.S. PATENT DOCUMENTS

| 4,225,751 A * | 9/1980 | Hershberger | .......... H04H 20/49 332/145 |
| 4,401,853 A | 8/1983 | Fisher et al. | |
| 8,824,531 B2 * | 9/2014 | Aue | .................... H04L 27/2662 375/224 |
| 2003/0128780 A1* | 7/2003 | Okamoto | ............ H04L 25/0228 375/346 |

(Continued)

FOREIGN PATENT DOCUMENTS

JP 2010-178308 A 8/2010

Primary Examiner — Linda Wong

(57) ABSTRACT

A receiver arranged to receive and to suppress a distortion in a receive signal, the receive signal comprising an information signal, the information signal occupying a first frequency band, the receive signal further comprising a pilot signal, the pilot signal occupying a second frequency band different from the first frequency band, the receiver comprising a pilot removal device arranged to receive a processed receive signal, and to extract and process the processed pilot signal from the processed receive signal as a processed extracted pilot signal, and to combine the processed extracted pilot signal with the processed receive signal to generate a distortion suppressed receive signal.

20 Claims, 12 Drawing Sheets

(56) References Cited

U.S. PATENT DOCUMENTS

| Publication No. | Date | Inventor | Classification | Subclass |
|---|---|---|---|---|
| 2004/0008618 A1* | 1/2004 | Shirakata | H04L 27/2679 | 370/208 |
| 2006/0182015 A1* | 8/2006 | Kim | H04L 27/2657 | 370/203 |
| 2009/0147834 A1* | 6/2009 | Kishigami | H04B 1/0458 | 375/148 |
| 2009/0154625 A1* | 6/2009 | Kwak | H04L 25/0232 | 375/359 |
| 2009/0285137 A1* | 11/2009 | Fujita | H04L 25/0232 | 370/310 |
| 2010/0074382 A1* | 3/2010 | Miyauchi | H04L 25/0216 | 375/347 |
| 2011/0019101 A1* | 1/2011 | Goto | H04L 27/2659 | 348/725 |
| 2011/0063519 A1* | 3/2011 | Hasegawa | H04L 27/0014 | 348/726 |
| 2011/0317790 A1* | 12/2011 | Yokokawa | H04L 5/0048 | 375/329 |
| 2012/0243596 A1* | 9/2012 | Lovell | H04L 25/0232 | 375/229 |
| 2012/0288037 A1* | 11/2012 | Patel | H04L 5/0048 | 375/340 |
| 2012/0314805 A1* | 12/2012 | Tsuboi | H04B 7/0413 | 375/295 |
| 2013/0136216 A1* | 5/2013 | Shirakata | H04L 27/0014 | 375/343 |
| 2013/0176873 A1* | 7/2013 | Ji | H04W 52/0283 | 370/252 |
| 2013/0177111 A1* | 7/2013 | You | H04L 27/2657 | 375/344 |
| 2013/0329775 A1* | 12/2013 | Yokokawa | H04L 25/0232 | 375/229 |
| 2015/0022263 A1* | 1/2015 | Kamata | H04L 27/22 | 329/327 |

* cited by examiner

DISTORTION SUPPRESSION FOR WIRELESS TRANSMISSION

TECHNICAL FIELD

The present disclosure relates to a transmitter, a receiver, and a method for suppressing a distortion in a receive signal.

BACKGROUND

Communication systems operating at high radio frequencies, RF, e.g., above 5-7 GHz, usually convert information signals from baseband frequencies to high RF by using high frequency voltage controlled oscillators, VCO, which add phase distortion to the information signal.

Phase distortion is added both at the transmit side of the communication system, as the baseband information signal is up-converted to high RF prior to transmission, and also at the receive side of the communication system, as the high RF receive signal is down-converted back to baseband in order to recover the transmitted information signal.

Communication systems operating at lower RF, e.g., below 3 GHz, on the other hand tend to introduce less phase distortion than high RF communication systems, because of the lower frequency VCOs involved. Contrary to the communication systems operating at high RF, the signal processing architectures of these types of lower RF communication systems are rarely designed for handling large amounts of phase distortion, as this would add unnecessary complexity to the signal processing architecture.

High RF communication systems have been proposed for use in transporting the information signals of other communication systems, such as lower RF communication systems including mobile phone systems, mobile broadband systems, long term evolution, LTE, systems, and wireless local area networks, LAN, WiFi, WIMAX. Transporting here means that the information signal of the lower RF communication system is transmitted by the high RF system without regeneration of the modulated data in the information signal. This type of transport is at times referred to as "front-hauling".

One way of transporting lower RF information signals over a high RF communication system is to up-convert the lower RF information signals to be transported either from baseband quadrature components or from a low carrier frequency (e.g. 2 GHz) up to the high RF. However, the VCOs used for up- and down-conversion will, as explained above, add distortion that in many cases will make the transmitted data impossible to recover by the lower frequency communication system signal processing architecture, since this architecture was not designed to cope with, e.g., high levels of phase noise.

Consequently, there is a need for distortion suppression in, e.g., high RF systems which does not require regeneration of data in the transported information signal.

SUMMARY

An object of the present disclosure is to provide at least a method, a transmitter, and a receiver which seeks to mitigate, alleviate, or eliminate one or more of the above-identified deficiencies in the art and disadvantages singly or in any combination and to provide a wireless transmission system with distortion suppression.

This object is obtained by a receiver arranged to receive and to suppress a distortion in a receive signal. The receive signal comprises an information signal. The information signal occupies a first frequency band. The receive signal also comprises a pilot signal which occupies a second frequency band different from the first frequency band. The receiver comprises a front end unit adapted to receive the receive signal and to generate a processed receive signal comprising a processed pilot signal and a processed information signal. The receiver further comprises a pilot removal device arranged to receive the processed receive signal. The pilot removal device comprises a pilot extractor unit, a pilot processor unit, and a compensator unit. The pilot extractor unit is arranged to extract the processed pilot signal from the processed receive signal as an extracted pilot signal. The pilot processor unit is arranged to generate a processed extracted pilot signal from the extracted pilot signal. The compensator unit is arranged to combine the processed extracted pilot signal with the processed receive signal to generate a distortion suppressed receive signal. The pilot removal device is arranged to output the distortion suppressed receive signal as an output signal of the receiver.

Thus, as long as a distortion affects both the extracted pilot signal and the processed information signal, the combining by the compensator unit will compensate for at least part of said distortion resulting in a suppression of said distortion.

According to an aspect, the distortion which is compensated for by the compensator unit comprises either of, or a combination of, a phase distortion due to frequency conversion by at least one voltage controlled oscillator and a frequency error.

Herein, phase distortion also comprises frequency error, i.e., a difference in up-conversion and down-conversion frequency. Consequently, a frequency error between transmitter and receiver is compensated for by the present technique.

According to an aspect, the front end unit of the receiver is adapted to obtain a first mixing signal. The first mixing signal has a first mixing signal frequency to make the frequency band of the information signal comprised in the distortion suppressed receive signal coincide with the frequency band of the information signal comprised in the receive signal.

Consequently, the information signal frequency spectrum on the input and on the output of the receiver are the same. Hence, the receiver according to the above aspect is transparent in the sense that it does not affect the frequency location of the information signal frequency band, which is a benefit of the disclosure.

According to an aspect, the compensator unit of the pilot removal device comprises a pilot mixer unit adapted to combine the processed receive signal and the processed extracted pilot signal by multiplying, i.e., mixing, the processed receive signal by the processed extracted pilot signal, thus generating the distortion suppressed receive signal.

According to an aspect, the pilot extractor unit of the pilot removal device comprises a pilot extraction filter arranged to suppress at least the first frequency band, and to pass at least the second frequency band, in order to obtain the extracted pilot signal from the processed receive signal.

Consequently, partly due to that the pilot signal and the information signal occupies non-overlapping frequency bands, the extraction of the pilot signal from the receive signal can be implemented by a passive filter arranged to filter out the second frequency band. This is a benefit of the disclosure since said passive filter can be implemented in a cost effective manner without excessive power consumption.

According to an aspect, the pilot processor unit of the pilot removal device comprises a pilot post-processing unit arranged obtain a pilot frequency conversion signal, and to convert the frequency spectrum of the extracted pilot signal by multiplying the extracted pilot signal by the pilot frequency conversion signal to make a processed extracted pilot signal. The pilot post-processing unit is arranged to filter the extracted pilot signal by a pilot filter prior to multiplying, i.e., mixing, the processed extracted pilot signal by the processed receive signal to generate the distortion suppressed receive signal.

Thus, by shifting the frequency band of the extracted pilot signal up or down in frequency, the location of the frequency band of the distortion suppressed receive signal can be controlled, i.e., positioned at a pre-determined center frequency determined by the frequency of the pilot frequency conversion signal.

According to an aspect, the pilot processor unit of the pilot removal device comprises a tracking filter arranged to track the extracted pilot signal to generate the processed extracted pilot signal in order to suppress wide-band additive noise in the processed extracted pilot signal. The tracking filter comprises either of a Kalman filter, a particle filter, and a Wiener filter.

Thus, by the feature of the tracking filter, the signal quality of the extracted pilot signal is improved by the suppression of said wide-band additive noise in the processed extracted pilot signal. This is a benefit since the overall distortion in the system is reduced.

According to an aspect, the pilot processor unit of the pilot removal device also comprises a modulation removal unit adapted to remove a modulation from the extracted pilot signal to generate a processed extracted pilot signal, prior to multiplying the processed extracted pilot signal by the processed receive signal to generate the distortion suppressed receive signal.

The object stated above is also obtained by a transmitter for transmitting a transmit signal. The transmit signal comprises an information signal. The information signal occupies a first frequency band. The transmit signal also comprises a pilot signal. The pilot signal occupies a second frequency band different from the first frequency band. The transmitter is arranged to obtain an input information signal and to generate the information signal from the input information signal. The transmitter also comprises a pilot addition device arranged to obtain the pilot signal. The pilot signal is phase synchronized with the information signal. The pilot addition device is also arranged to generate the transmit signal of the transmitter by combining the pilot signal and the information signal.

Thus, by the disclosed transmitter unit, a transmit signal is generated which makes it possible to implement distortion suppression at the receive side as discussed above without re-generation of the information signal, i.e., detection of the information content, followed by phase tracking and re-modulation.

According to an aspect, the pilot addition device comprises a pilot generator arranged to generate the pilot signal obtained by the pilot addition device, and a transmit mixer device arranged to multiply the input information signal by the pilot signal to make the information signal. The pilot addition device further comprises a pilot adder arranged to combine the information signal with the pilot signal to obtain the transmit signal of the transmitter, thus providing phase synchronization between pilot signal and information signal.

By the feature of phase synchronization between pilot signal and information signal, distortion in the communication system is further reduced. This is due to that no phase distortion is introduced when down-converting a received signal using an extracted pilot signal, since phase synchronization has been established at the transmitter.

According to an aspect the transmitter is also arranged to receive a pilot data signal, and the pilot addition device also comprises a modulator arranged to modulate the pilot signal by the pilot data signal prior to combining the modulated pilot signal and the information signal to obtain the transmit signal, thus providing a spectrally broadened pilot signal carrying the pilot data signal.

It is a benefit of the feature of providing a spectrally broadened pilot signal that the spectrally broadened pilot signal carries more energy than a pilot signal which has not been spectrally broadened, given equal spectral magnitude. Thus an improved pilot signal to noise ratio is achieved without exceeding, e.g., a spectral mask or transmission license of the communication system.

The object stated above is further obtained by a communication system comprising a transmitter, a transmission conduit, and a receiver. The transmitter is arranged to receive an input information signal, and to obtain a pilot signal, as well as to generate a transmit signal.

The transmit signal comprises the pilot signal and also an information signal originating from the input information signal. The transmission conduit is arranged to receive the transmit signal from the transmitter, and to add a distortion to the transmit signal to make a distorted transmit signal. The receiver is arranged to receive the distorted transmit signal as a receive signal from the transmission conduit. The receiver is arranged to extract the pilot signal from the receive signal as an extracted pilot signal, and to process the extracted pilot signal to generate a processed extracted pilot signal, as well as to combine the processed extracted pilot signal with the receive signal to obtain a distortion suppressed receive signal. The communication system thus being adapted to suppress a distortion added by the transmission conduit to the receive signal.

According to an aspect, the transmission conduit comprises a secondary transmitter and a secondary receiver. The secondary transmitter is arranged to receive the transmit signal and to re-transmit the transmit signal to the secondary receiver. The secondary receiver is arranged to receive the re-transmitted transmit signal in order to generate the receive signal. The receiver is arranged to receive the receive signal from the secondary receiver.

Said object stated above is also obtained by a method in a receiver for suppressing a distortion in a receive signal. The method comprises the step of obtaining a receive signal comprising an information signal. The information signal occupies a first frequency band. The receive signal further comprises a pilot signal, the pilot signal occupying a second frequency band different from the first frequency band. The method also comprises the step of extracting the pilot signal from the receive signal to obtain an extracted pilot signal, and also combining the receive signal and the extracted pilot signal to generate a distortion suppressed receive signal. The method further comprises the step of using the distortion suppressed receive signal as an output signal of the receiver.

According to an aspect, the step of extracting further comprises filtering the receive signal by a pilot extraction filter arranged to suppress at least the first frequency band, and to pass at least the second frequency band, in order to obtain the extracted pilot signal from the receive signal.

Said object is further obtained by a method, in a communication system, the communication system comprising a transmitter, a transmission conduit, and a receiver. The method comprises the steps of obtaining an information signal and a pilot signal in a transmitter, and also the step of transmitting, from the transmitter, a transmit signal of the communication system comprising a combination of the information signal and the pilot signal, via a transmission conduit adding a distortion to the transmit signal, to the receiver. The method further comprises the step of receiving the distorted transmit signal from the transmission conduit as a receive signal in the receiver, and extracting, in the receiver, the pilot signal from the receive signal as an extracted pilot signal. The method also comprises the step of combining, in the receiver, the extracted pilot signal with the receive signal to obtain a distortion suppressed receive signal of the communication system.

The disclosed apparatus and methods enable the transmission of signals with strict requirements on low phase noise over a transmission conduit with relatively high phase noise addition. Further it is a benefit of the disclosure that said distortion suppression is done independently of the transmitted data, thus the transmitted data need not be detected and re-generated following transmission by the transmission conduit.

A feature which simplifies distortion suppression independent of transmitted data is the feature of the information signal residing in a first frequency band which does not overlap a second frequency band in which the pilot signal resides.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
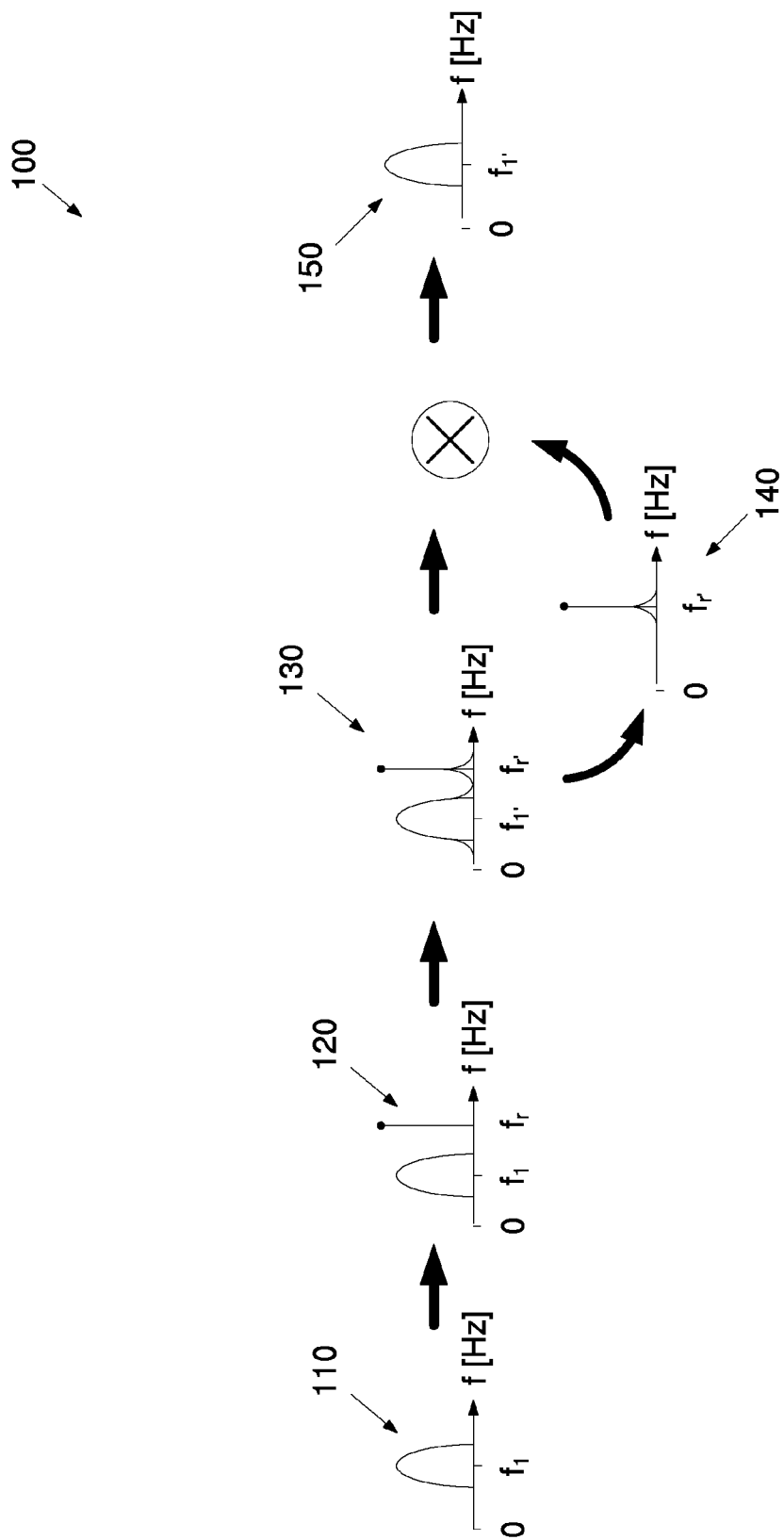
FIG. 1 schematically shows a system overview of a distortion compensation technique.

Aspects of the present disclosure will be described more fully hereinafter with reference to the accompanying drawings. The apparatuses' and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

FIG. 1 shows a system overview 100 of a distortion compensation technique of the disclosure in the frequency domain. The distortion which is compensated for comprises, in embodiments, a phase distortion and possibly also a frequency error. In other embodiments the distortion comprises other types of distortion such as non-linear distortion introduced by non-linear elements such as amplifiers in the communication system.

According to aspects of the disclosure, phase distortion herein also comprises a frequency error, i.e., a difference in transmitter up-conversion and receiver down-conversion frequency. Consequently, a frequency error between transmitter and receiver is compensated for by the present technique.

Consequently, according to an aspect, a technique for phase distortion mitigation in high frequency communication systems, such as, e.g., microwave radio links, is disclosed. The technique is suitable for transmission of an information signal 110 with a predefined maximum bandwidth around a center frequency $f_1$ Hz and comprises adding a pilot signal 120 outside the bandwidth of the information signal 110 to be transmitted at $f_r$ Hz. The pilot signal 120 is added by a transmitter, or by a device disposed in connection to the transmitter.

The communication system adds phase distortion during transmission, shown in FIG. 1 as a widening of signal spectra of a received signal 130. An important concept of the disclosure is that equal or similar phase distortion is added to the pilot signal 120 and to the information signal 110, since they pass the same distortion-inducing components. The receiver then uses the pilot signal to compensate for the phase distortion in order to recover the information signal with a minimum addition of phase distortion.

This usage of the pilot signal at the receiver is accomplished by first extracting the pilot signal 140 from the received signal 130 and then combining the extracted pilot signal 140 with the received signal 130 in order to obtain a distortion suppressed receive signal 150 with a minimum of phase distortion. The combining constitutes, according to aspects of the disclosure, a mixing, i.e., a multiplication, of the extracted pilot signal 140 and the received signal 130.

Thus, a concept of the disclosure is to add a pilot signal, or pilot tone, at a frequency just outside the spectrum allocated for the information signal to be transmitted. The pilot signal is added at baseband or at an intermediate carrier frequency in order to place it close to the information spectrum and simplify filtering. If the pilot signal is synchronous with the information signal, then distortion in the communication system can be reduced further, and thus a synchronization between the information signal and the pilot signal is present in embodiments. However, synchronization between pilot signal and information signal is not a requirement of the technique.

An application of the disclosure is the transmission of a legacy radio signal over a high frequency microwave radio link. In said application the technique of the disclosure is embodied in add-on units inserted between the existing legacy radio and the microwave radio to enable transmission over a link with high phase noise.

Figure 2:
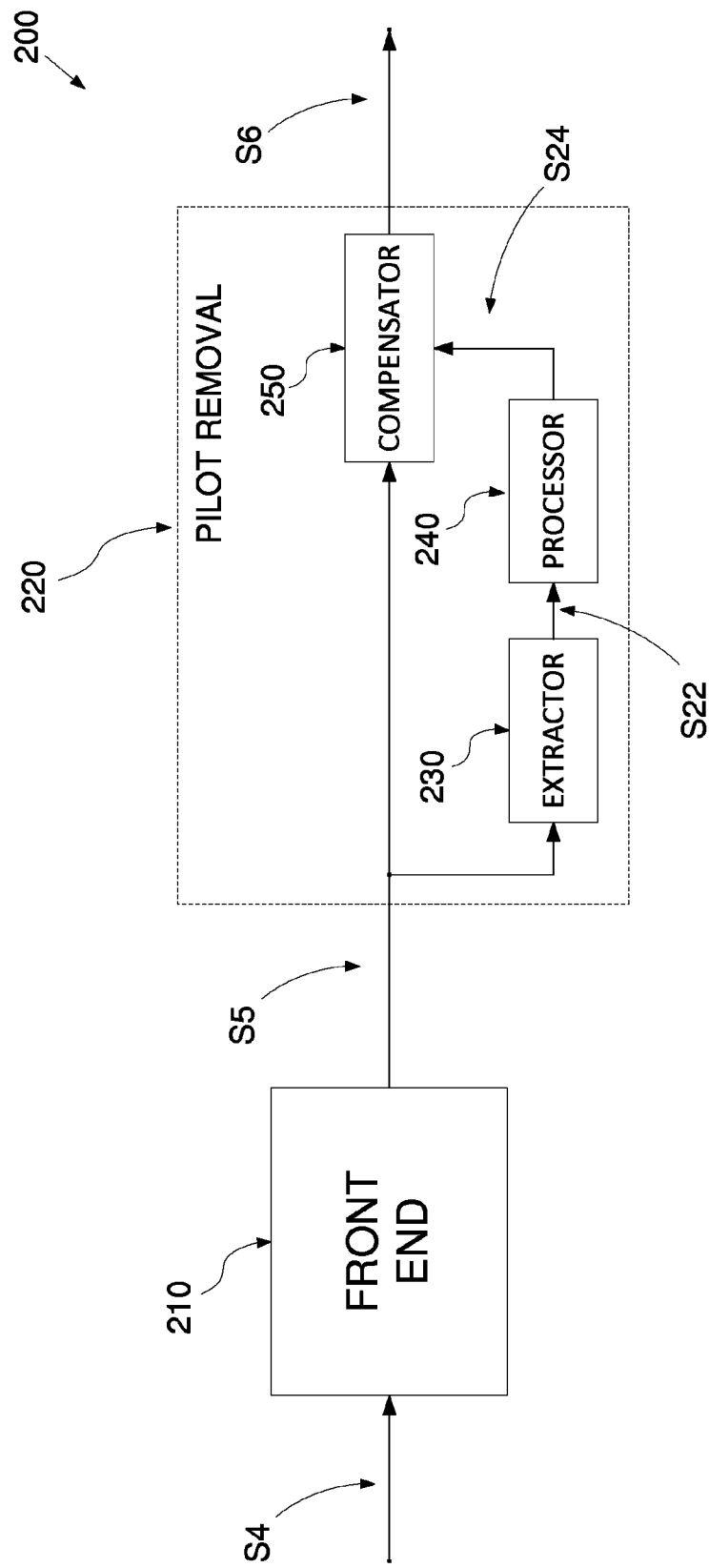
FIGS. 2-4 are block diagrams showing embodiments of a receiver of the disclosure.

FIG. 2 shows a receiver 200 arranged to receive and to suppress a distortion in a receive signal S4. The receive signal S4 comprises an information signal which occupies a first frequency band. The receive signal S4 also comprises a pilot signal S0 which occupies a second frequency band different from the first frequency band.

Thus, there is no overlap in frequency between the first and the second frequency band. In aspects where the pilot signal or the information signal is not strictly band limited and occupies a very wide band, no overlap in frequency should be construed as meaning that there is no significant information signal energy present in the second frequency band, and no significant pilot signal energy present in the first frequency band.

As will be made clear below, the feature of the pilot signal and the information signal occupying different frequency bands simplifies an extraction of the pilot signal S0 from the receive signal S4.

The receiver 200 also comprises a front end unit 210 adapted to receive the receive signal S4 and to generate a processed receive signal S5 comprising a processed pilot signal and a processed information signal. The receiver 200 further comprises a pilot removal device 220 arranged to receive the processed receive signal S5. The pilot removal device 220 comprises a pilot extractor unit 230, a pilot processor unit 240, and a compensator unit 250. The pilot extractor unit 220 is arranged to extract the processed pilot signal from the processed receive signal S5 as an extracted pilot signal S22. The pilot processor unit 240 is arranged to generate a processed extracted pilot signal S24 from the extracted pilot signal S22. The compensator unit 250 is arranged to combine the processed extracted pilot signal S24 with the processed receive signal S5 to generate a distortion suppressed receive signal S6. The pilot removal device 220 is then arranged to output said distortion suppressed receive signal S6 as an output signal of the receiver 200.

According to an aspect, the pilot removal device 220 further comprises a delay unit, not shown in FIG. 1, arranged to delay the processed receive signal S5 prior to combining by the compensator unit 250. Thus the processed extracted pilot signal is arranged to be time-aligned with the processed pilot signal comprised in the processed receive signal S5 at the point of compensation by the compensator unit 250.

Since the processed extracted pilot signal S24 is affected by the same distortion as the processed information signal, the distortion in the information signal is compensated for by the combining with the processed extracted pilot signal.

Distortion in the receive signal is therefore compensated for without need for re-generation of the information signal, i.e. detecting data and re-modulating. Consequently, the transmission via the receiver 200 can be done transparently, i.e., the transported signal does not need to be a known signal which is possible to demodulate, and the communication system which is the source of the information signal does not need to be aware of the presence of the receiver 200.

Figure 3:
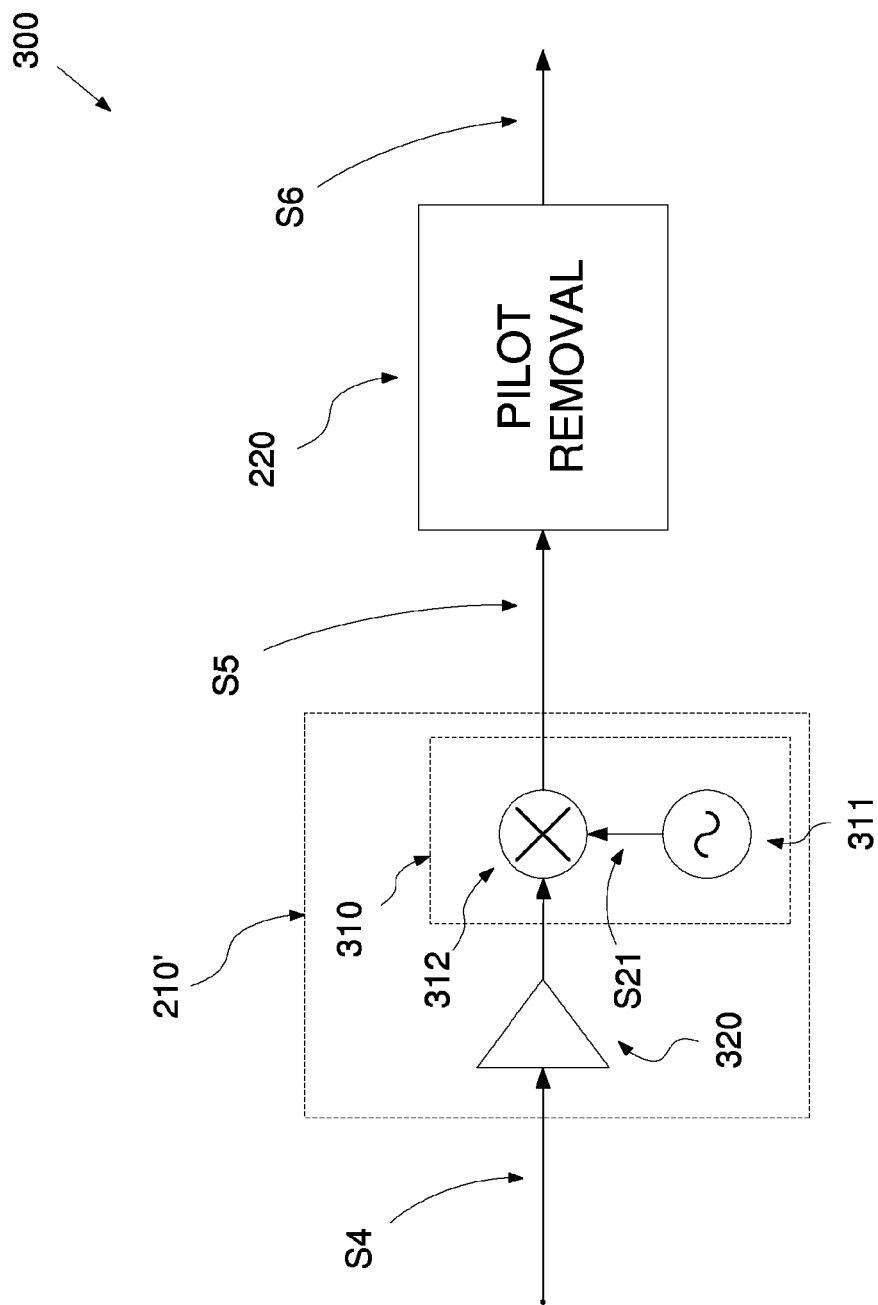

FIG. 3 shows a receiver 300 according to an aspect of the disclosure wherein the front end unit 210' comprises a receive amplifier unit 320 arranged to amplify the receive signal S4.

It is noted that any distortion added by said amplifier affects both pilot signal and information signal in equal or at least similar ways. Consequently, a part of such distortion is compensated for by the pilot removal device 220 due to said extraction and combining of the pilot signal and information signal.

The front end unit 210' shown in FIG. 3 is further adapted to obtain a first mixing signal S21. According to an aspect, the first mixing signal S21 has a first mixing signal frequency to make the frequency band of the information signal comprised in the distortion suppressed receive signal S6 coincide with the frequency band of the information signal comprised in the receive signal S4.

The front end unit 210' shown in FIG. 3 also comprises a receive mixer device 310. The receive mixer device 310 is arranged to obtain, by a mixing signal generator 311, the first mixing signal S21, and to generate the processed receive signal S5 by multiplying 312, i.e., mixing, the receive signal S4 by the first mixing signal S21.

Consequently, by selection of the first mixing signal frequency S21, the input frequency spectra of the information signal comprised in the receive signal S4 will coincide with the output frequency spectra of the information signal in the distortion suppressed receive signal S6. This is a key feature in systems which require a constant frequency spectra to be maintained during transmission.

Thus, according to an aspect, the information signal in the distortion suppressed receive signal S6 is arranged to have a frequency band which co-incides in frequency with the frequency band of the information signal comprised in the receive signal S4. Some microwave radios often require input and output signals at specific RF frequencies that add some additional complexity in the receiver circuit. Thus, implementations and embodiments of the present technique are foreseen where a microwave receiver outputs a received signal at a given center frequency and the legacy radio (an LTE radio receiver according to an aspect), i.e., the radio arranged to receive the interference suppress receive signal S6, also requires the center frequency of the signal to appear at the given center frequency. Consequently, it is a benefit if the input frequency spectra of the information signal comprised in the receive signal S4 coincides with the output frequency spectra of the information signal in the distortion suppressed receive signal, since it can simplify design and adaptation of other communication equipment.

Figure 4:
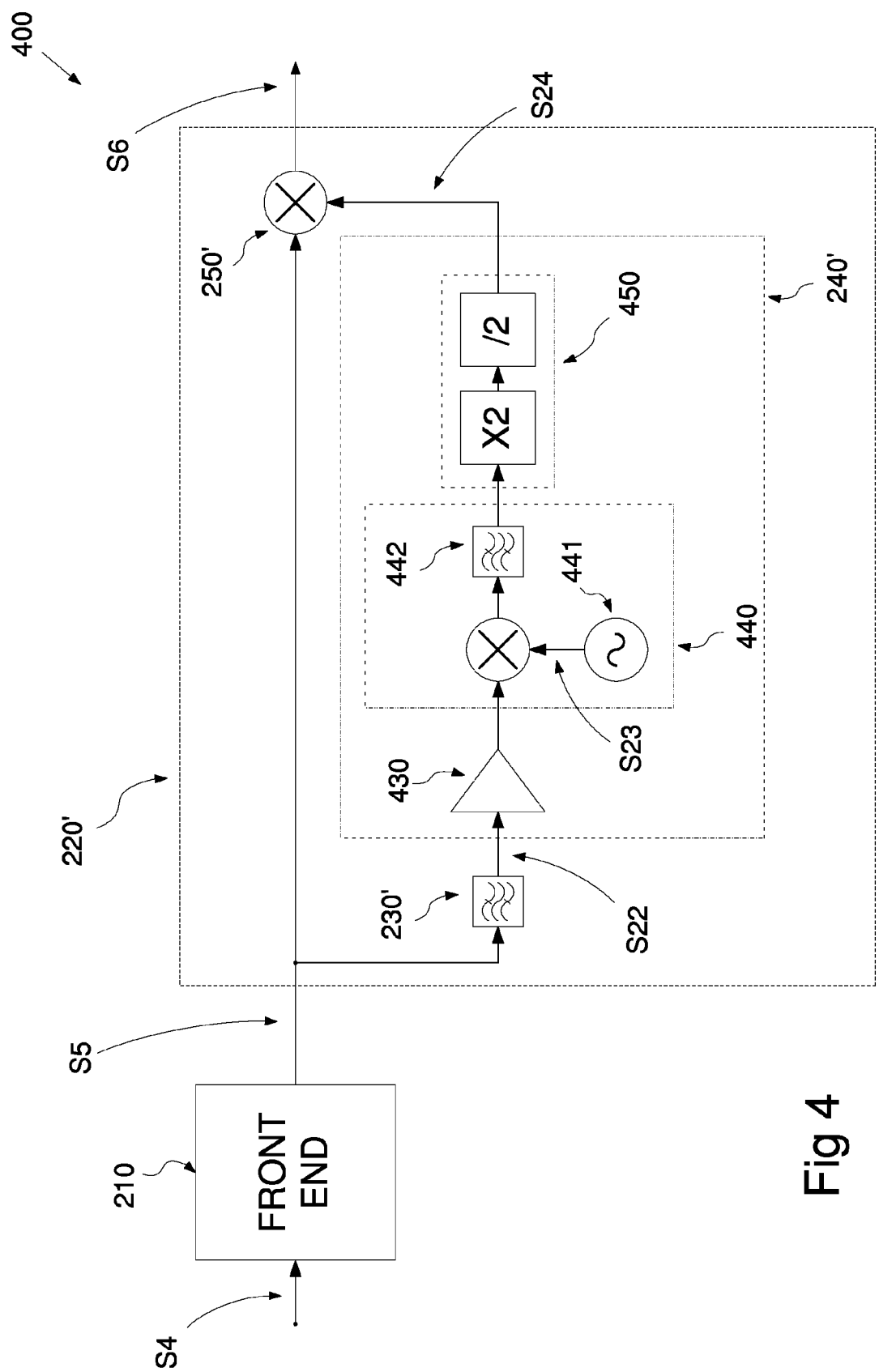

FIG. 4 shows a receiver 400 according to an aspect of the disclosure. The compensator unit 250 of the pilot removal device 220' in the receiver 400 here comprises a pilot mixer unit 250' adapted to combine the processed receive signal S5 and the processed extracted pilot signal S24 by multiplying the processed receive signal S5 by the processed extracted pilot signal S24. Thus the distortion suppressed receive signal S6 is generated.

The pilot extractor unit 230 of the pilot removal device 220' shown in FIG. 4 comprises a pilot extraction filter 230' arranged to suppress at least the first frequency band, and to pass at least the second frequency band, in order to obtain the extracted pilot signal S22 from the processed receive signal S5.

The feature of having the pilot signal and information signal separated in frequency simplifies the extraction of the pilot signal, which extraction is here embodied by a passive filter. However, more advanced extraction techniques are of course possible, including active filtering techniques comprising more advanced signal processing routines arranged for noise suppression.

As shown in FIG. 4, the pilot processor unit 240' of the pilot removal device 220' further comprises a pilot amplifier unit 430 arranged to amplify the extracted pilot signal S22.

FIG. 4 also shows a pilot processor unit 240' with examples of a pilot post-processing unit 440 and a modulation removal unit 450. These functional blocks can in various aspects of the embodiment shown in FIG. 4 be implemented in different ways. The particular implementations shown in FIG. 4 are only to be construed as examples. It should also be noted that neither of the pilot post-processing unit 440 or the modulation removal unit 450 are necessary to achieve full functionality in the present technique.

As shown in FIG. 4, the pilot processor unit 240' of the pilot removal device 220' comprises a pilot post-processing unit 440 arranged obtain 441 a pilot frequency conversion signal S23, and to convert the frequency spectrum of the extracted pilot signal S22 by multiplying the extracted pilot signal S22 by the pilot frequency conversion signal S23 to make a processed extracted pilot signal S24. The pilot post-processing unit 440 shown in FIG. 4 is also arranged to filter the extracted pilot signal S22 by a pilot filter 442 prior to multiplying the processed extracted pilot signal S24 by the processed receive signal S5 to generate the distortion suppressed receive signal S6.

A benefit of said pilot frequency conversion signal S23 is that, by setting the frequency of the pilot frequency conversion signal S23 to a pre-determined value, the center frequency of the interference suppressed receive signal is determined. Thus the center frequency of the interference suppressed receive signal can be controlled.

According to an aspect, the pilot processor unit 240' of the pilot removal device 220' also comprises a tracking filter, not shown in FIG. 4, arranged to track the extracted pilot signal S22 to generate the processed extracted pilot signal S24 in order to suppress wide-band additive noise in the processed extracted pilot signal S24, the tracking filter comprising either of a Kalman filter, a particle filter, and a Wiener filter.

According to an aspect, the pilot processor unit 240' also comprises a modulation removal unit 450 adapted to remove a modulation from the extracted pilot signal S22 to generate a processed extracted pilot signal S24, prior to multiplying the processed extracted pilot signal S24 by the processed receive signal S5 to generate the distortion suppressed receive signal S6.

The modulation removal unit 450 shown in FIG. 4 is arranged to remove a binary phase shift keying, BPSK, modulation. However, aspects of the receiver 400 comprises other types of modulation removal units adapted to remove other types of modulations from the processed extracted pilot signal S24.

According to an aspect, the receiver 400 also comprises a pilot detector unit, not shown in FIG. 4, arranged to demodulate the extracted pilot signal S22 and to detect a pilot data signal S81 carried by the pilot signal S0, and to output the detected pilot data signal S81 as an output signal of the receiver 400.

Thus, the modulated pilot signal can be used to carry information to the receiver 400.

According to an aspect, the type of distortion of the receive signal discussed in connection to FIG. 2-4 comprises a phase noise, which phase noise distorts the phase of the receive signal S4. The phase noise may further comprise a frequency error.

Figure 5:
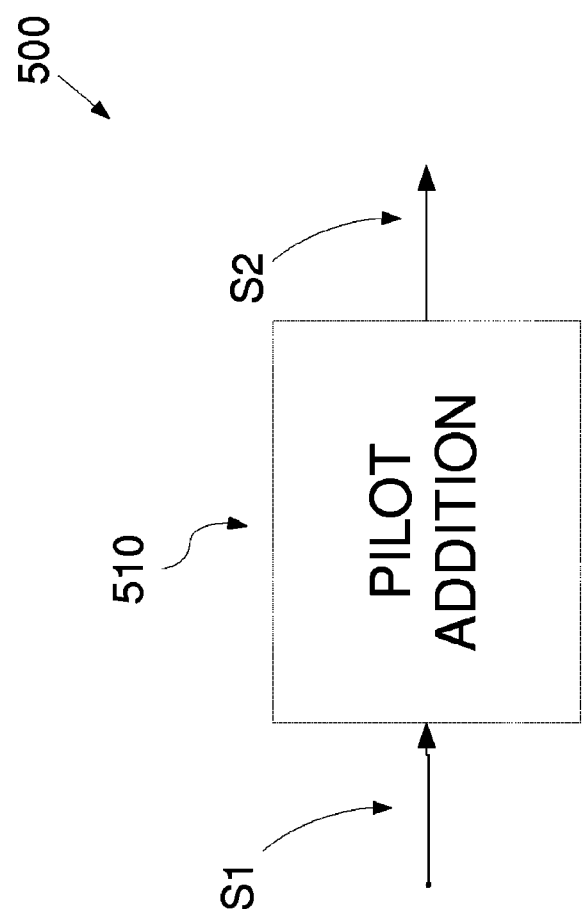
FIGS. 5-8 are block diagrams showing embodiments of a transmitter of the disclosure, and FIG. 9 schematically shows a communication system of the disclosure.

FIG. 5 shows a transmitter 500 for transmitting a transmit signal S2. The transmit signal S2 comprises an information signal S3 which occupies a first frequency band. The transmit signal S2 also comprises a pilot signal S0 which occupies a second frequency band different from the first frequency band.

The transmitter 500 is arranged to obtain an input information signal S1 and to generate the information signal S3 from the input information signal S1. The transmitter 500 also comprises a pilot addition device 510 arranged to generate or obtain the pilot signal S0. The pilot signal S0 is phase synchronized with the information signal S3. The pilot addition device 510 is also arranged to generate the transmit signal S2 of the transmitter 500 by combining the pilot signal S0 and the information signal S3.

The transmitter shown in FIG. 5 is adapted for operation together with the receivers shown in FIG. 2-4.

Figure 6:
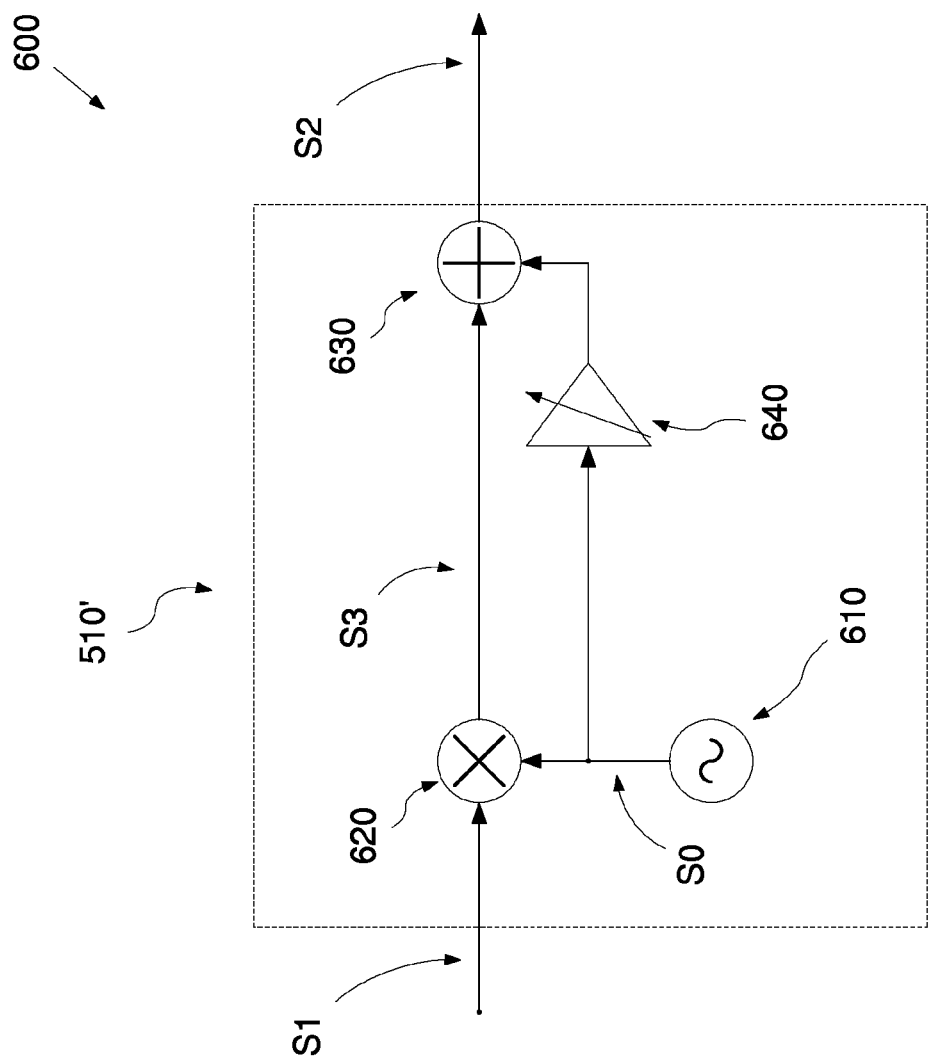

FIG. 6 shows a transmitter 600 according to an aspect of the disclosure. The pilot addition device 510' here comprises a pilot generator 610 arranged to generate the pilot signal S0, and also a transmit mixer device 620 arranged to multiply the input information signal S1 by the pilot signal S0 to make the information signal S3. The pilot addition device 510' further comprises a pilot adder 630 arranged to combine the information signal S3 with the pilot signal S0 to obtain the transmit signal S2 of the transmitter 600, thus providing phase synchronization between pilot signal S0 and information signal S3.

It is noted that it is not a requirement of the technique that the pilot signal S0 is phase synchronized with the information signal S3, but distortion will be reduced at the receiver if this is the case.

In an embodiment, the pilot signal is simply added to the signal to be transmitted outside the signal spectrum. The spectral separation between the edge of the information signal spectrum and the pilot signal spectrum should be as small as possible in order to not sacrifice spectral efficiency, but at the same time it must be possible to filter out the pilot signal in a receiver and the separation must allow space for added phase noise and frequency drift added by involved oscillators.

Even if there is no knowledge of the modulation and symbol rate of an information signal to be transmitted over, e.g., a microwave link, it is still possible to obtain synchronization between pilot signal and information signal. In one solution to the synchronization problem, the information signal to be transmitted is mixed with the pilot signal and thus the pilot signal and information signal inherently shares the same phase noise and frequency drift as imposed by the pilot signal and arbitrary energy of the pilot signal is added in the final combiner and the amplitude of the pilot signal can be arbitrarily controlled using gain or loss in the pilot addition path. The single mixer implementation shown in FIG. 6 generates two copies of the signal spectrum around the pilot signal, or tone, and a filter should, if necessary, remove one of the side-bands. This removal can be difficult if the pilot is very close to the information signal.

Figure 7:
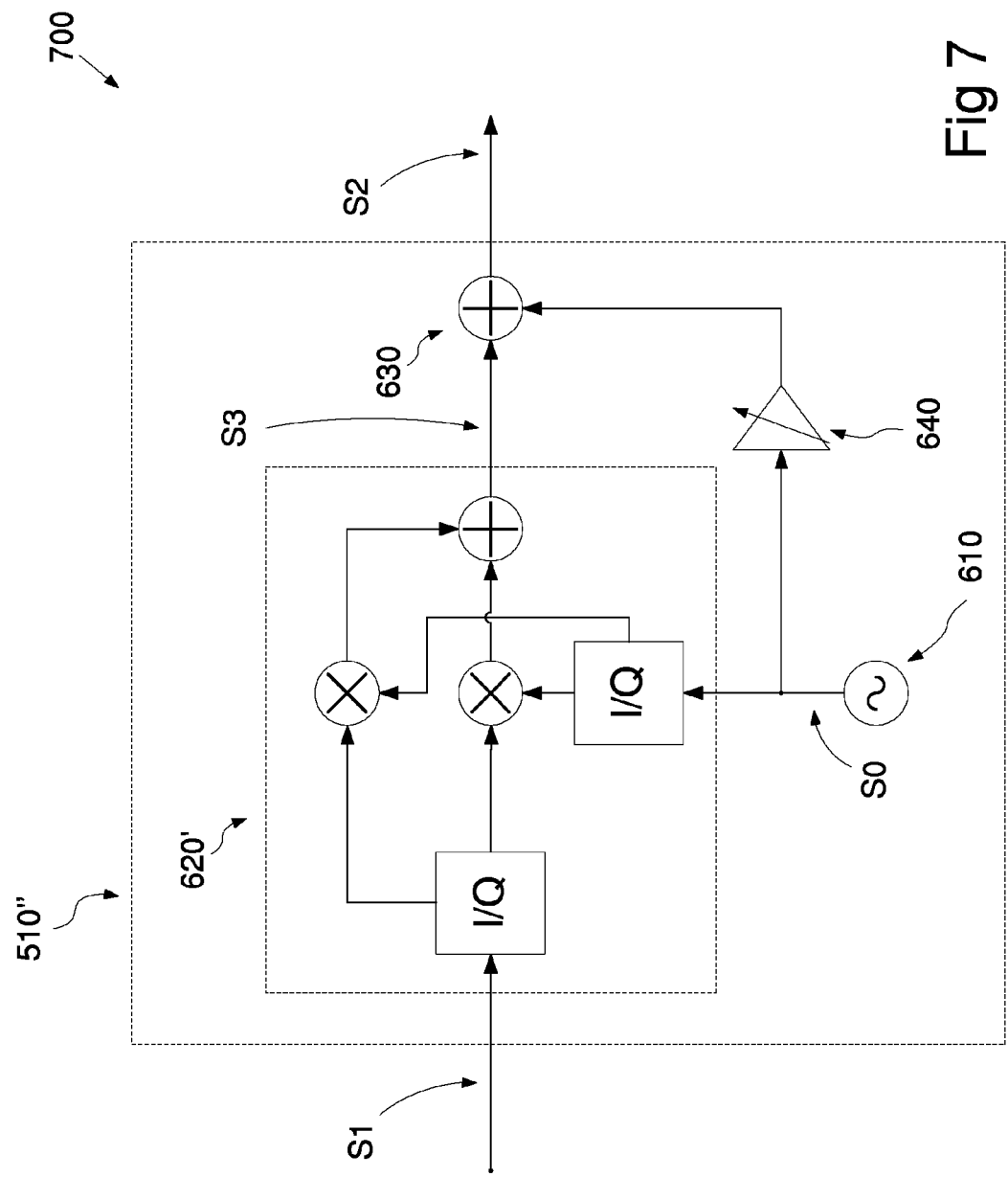

FIG. 7 shows a transmitter 700 according to an aspect of the disclosure. The transmit mixer device 620' is here arranged as an in-phase/quadrature, I/Q, mixer device adapted to divide the input information signal S1 into I and Q components, and to multiply I and Q components of the input information signal S1 by I and Q components of the pilot signal S0, respectively. The pilot addition device 510" is further arranged to add the respective multiplied I and Q components of the input information signal to make the information signal S3. The pilot adder 630 is also arranged to add the pilot signal S0 to the information signal S3 to obtain the transmit signal S2 of the transmitter 700, thus providing phase synchronization between pilot signal S0 and information signal S3.

Aspects of the transmitter 600, 700 shown in FIGS. 6 and 7 also comprises a variable pilot gain device 640 arranged to amplify the pilot signal S0 prior to combining the pilot signal S0 and the information signal S3 to generate the transmit signal S2.

FIG. 7 shows a single side-band (SSB) scheme where only one signal side-band is generated and thus no output filter is required. Here an I-Q up-converter mixer structure is used where only one output side-band inherently is generated around the pilot signal frequency and thus no filter is required which allows the pilot signal to be placed very close to the information signal spectrum. In order to obtain a single spectrum at the output, one of the two data signals injected to the mixers must ideally be a Hilbert transform of the other, but for narrow band information signal spectrums, a conventional 90° hybrid can be used.

Figure 8:
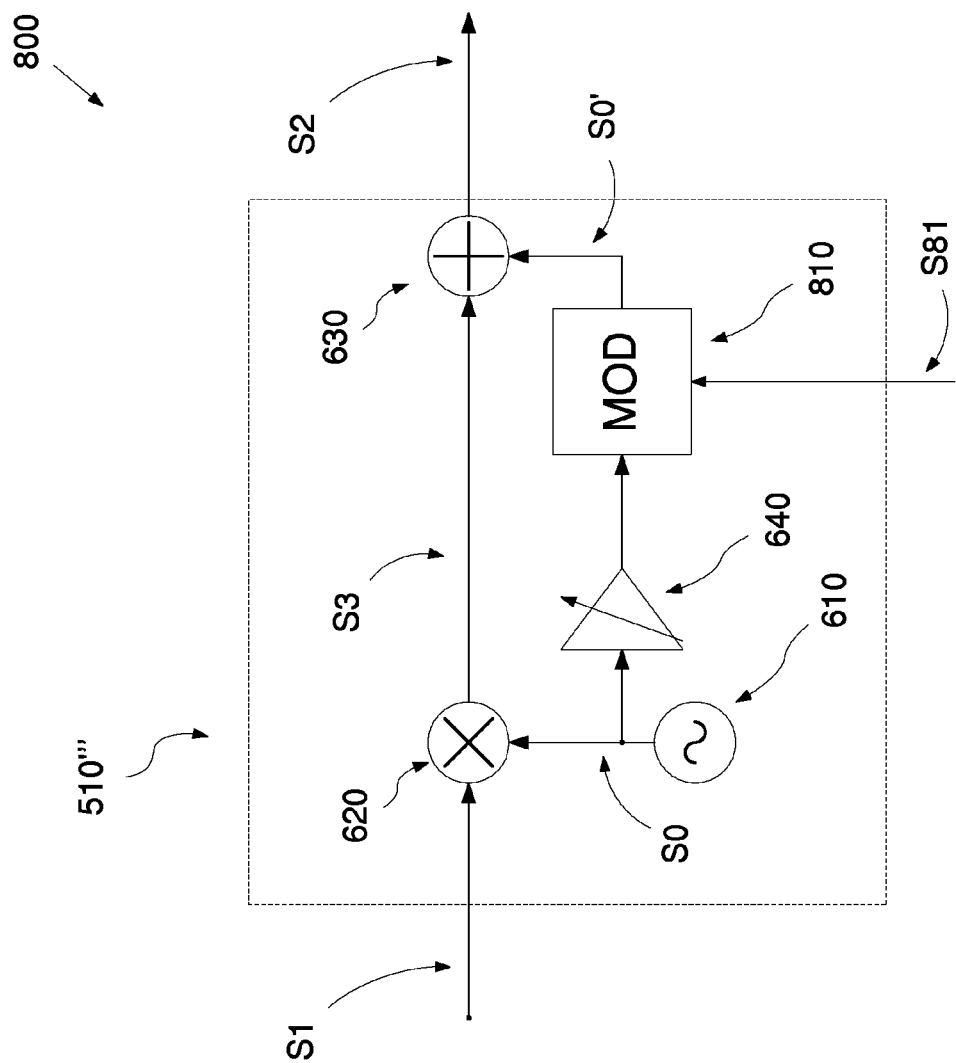

FIG. 8 shows an aspect of the transmitter 800 further arranged to receive a pilot data signal S81. The pilot addition device 510''' here also comprises a modulator 810 arranged to modulate the pilot signal S0 by the pilot data signal S81 prior to combining the modulated pilot signal S0' and the information signal S3 to obtain the transmit signal S2, thus providing a spectrally broadened pilot signal S0' carrying the pilot data signal S81.

Thus, there is also disclosed herein a concept for broadening the spectrum of the pilot signal in order to provide sufficient energy in the pilot signal and also enable data transmission on the pilot signal for use by, e.g., a supervision and/or management system. In this case data with a modulation format such as BPSK or quadrature phase shift keying, QPSK, is modulated on the pilot signal and before phase noise mitigation this data is removed by a simple clock recovery scheme. The spectral broadening of the pilot signal aims to make the total high frequency transmission amplitude spectrum fulfill any spectrum mask requirements stipulated by, e.g., regulation authorities.

In order to make the technique described above successful, the signal to noise ratio, SNR, of the pilot signal must be sufficient in order to not add excessive noise to the signal upon the final combining process between information signal and extracted pilot signal. The actual required SNR is dependent on the modulation format used and filter bandwidth when filtering out the pilot signal to generate the extracted pilot signal. The required filter bandwidth depends on the amount of frequency offset to be restored and phase noise statistics. In realistic microwave links for instance, there are certain requirements on the RF output power over the link due to spectrum regulations that may vary between different countries. Often there is a requirement that all spectrum components must have the same amplitude across the channel used for communication given a specified measurement resolution bandwidth. For a wide bandwidth channel spectrum, this requirement can sometimes restrict the energy in the pilot signal and thus restrict the system to use a pilot signal with too low SNR in order to make the system operate, i.e. not sufficient energy is transmitted in the pilot.

One solution to this problem is to modulate the pilot signal with data that can be removed before the phase noise compensation takes place at the receiver in order to allow more energy in the pilot signal. Of course this will require more spectrum for the pilot signal but the SNR can instead be increased. The modulation can be just random or a predetermined sequence of symbols in order to broaden the pilot signal spectrum using a predefined modulation format.

Thus, an aspect of the disclosure comprises to broaden the pilot spectrum in order to carry more energy in the pilot spectrum while still keeping the peak amplitude of the pilot amplitude spectrum within the air channel spectrum requirements. A benefit of this concept is that the pilot signal can be used to transmit information used to e.g. manage microwave radio units over the air link or to transmit other useful data. The removal process of the data on the pilot signal depends on the modulation format used but in principle any clock recovery system that can operate on the chosen modulation format can be used to extract the pilot signal.

According to an aspect a simple modulation format is used such as BPSK or QPSK. There exist several analog clock recovery techniques for these modulation formats but the simplest scheme is probably to square the signal in a frequency doubler circuit, which removes a BPSK modulation and doubles the pilot frequency. In case of QPSK another subsequent squaring of the signal removes four phase states of the data, correspond to take the signal to the power of four (e.g. using a frequency quadrupling circuit). Likely the frequency of the pilot should be divided with two or four, respectively, in order to bring the pilot back to the original frequency or the subsequent frequency conversion network must take this into account.

According to an aspect, the relative bandwidths of the pilot signal compared to the information signal are arranged to be continuously varied depending on propagation conditions in the communication system. Thus, when transmit conditions are favorable, the pilot signal occupies less bandwidth compared to scenarios where propagation conditions are less favorable.

Figure 9:
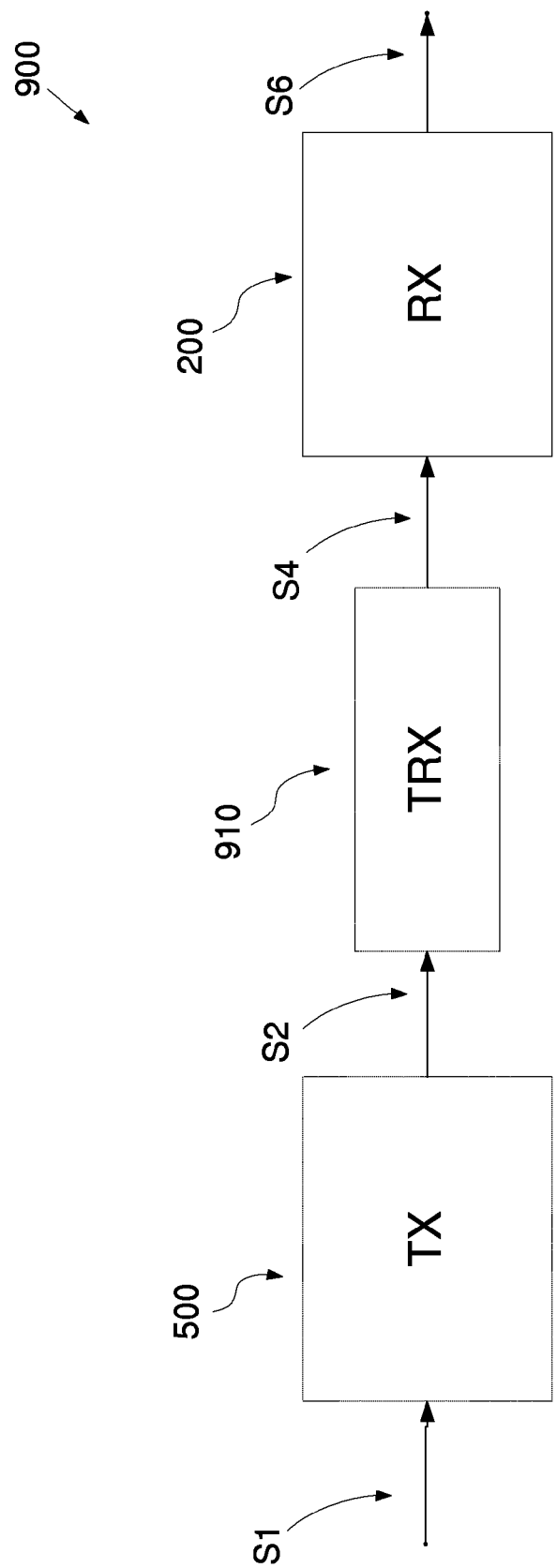

FIG. 9 shows a communication system 900 comprising a transmitter 500, a transmission conduit 910, and a receiver 200. The transmitter is arranged to receive an input information signal S1, and to obtain a pilot signal S0, as well as to generate a transmit signal S2. The transmit signal comprises the pilot signal S0 and also an information signal S3 originating from the input information signal S1. The transmission conduit 910 is arranged to receive the transmit signal S2 from the transmitter 500, and to add a distortion to the transmit signal S2 to make a distorted transmit signal. The receiver 200 is arranged to receive the distorted transmit signal as a receive signal S4 from the transmission conduit 910. The receiver 200 is arranged to extract the pilot signal S0 from the receive signal S4 as an extracted pilot signal S22, and to process the extracted pilot signal S22 to generate a processed extracted pilot signal S24, as well as to combine the processed extracted pilot signal S24 with the receive signal S4 to obtain a distortion suppressed receive signal S6. The communication system thus being adapted to suppress a distortion added by the transmission conduit 910 to the receive signal S4.

According to an aspect, the distortion added by the transmission conduit 910 comprises a phase noise which distorts the received phase of the receive signal S4, complicating detection of the information signal comprised in the receive signal S4. The phase noise may further comprise a frequency error.

According to an aspect, the transmission conduit 910 comprises a secondary transmitter and a secondary receiver, the secondary transmitter being arranged to receive the transmit signal S2 and to re-transmit the transmit signal S2 to the secondary receiver. The secondary receiver being arranged to receive the re-transmitted transmit signal in order to generate the receive signal S4. The receiver 200 is then arranged to receive the receive signal S4 from the secondary receiver.

According to an aspect, the transmitter 500 is arranged to obtain a pilot data signal S81 and to also modulate the pilot signal S0 by the pilot data signal S81 in order to provide a spectrally broadened pilot signal carrying the pilot data signal S81. The receiver 100 is then arranged to demodulate the extracted pilot signal S22 and to detect the pilot data signal S81 carried by the pilot signal S0. Thus a communication channel between transmitter 500 and receiver 100, over the transmission conduit 910 is provided by using the modulated pilot signal S0'.

According to an aspect of the communication system, the pilot signal is transmitted together with the information signal over the microwave channel and upon reception the receive signal is down-converted using heterodyne demodulation to an intermediate frequency, lower than the link carrier frequency. The heterodyne demodulation generates a signal spectrum that is spectrally inverted relative to the transmitted signal spectrum. The pilot signal is separated from the information signal and multiplied with the information signal spectrum in an analog RF mixer. After the mixing process, a restored copy of the signal is obtained without phase distortion. In principle all phase noise that are added to both the pilot and the signal can be compensated provided that sufficient energy and bandwidth are provided to the pilot tone. Note that the heterodyne demodulation process inverts the spectrum and that the mixing of the signal and pilot re-inverts the spectrum back to original. Of course non-inverting heterodyne demodulation can be utilized but then the compensated spectrum will be inverted. This can however, easily be corrected for in the baseband processing and data recovery circuit.

Figure 10:
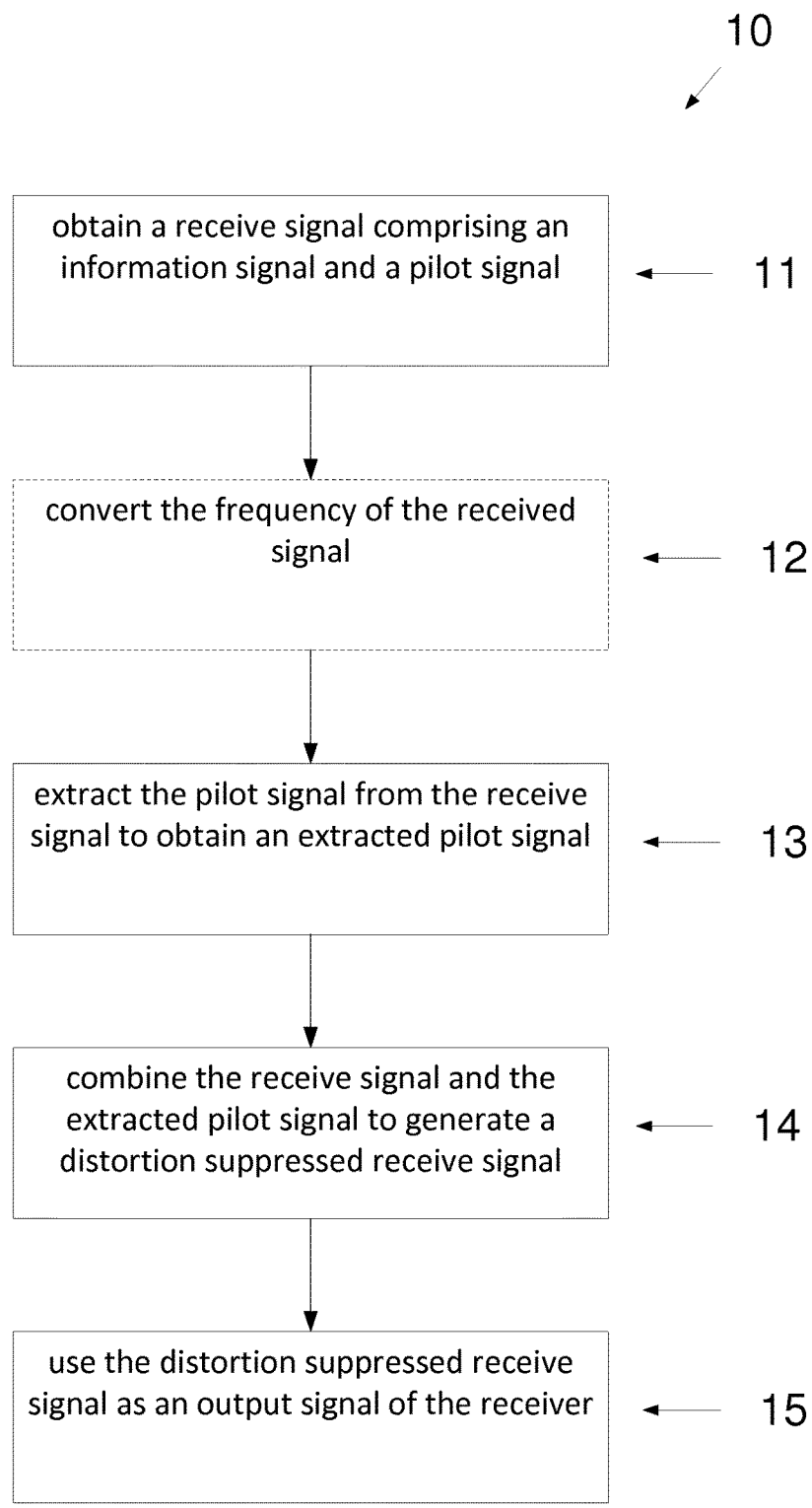
FIGS. 10-12 are flowcharts illustrating embodiments of a method of the disclosure.

FIG. 10 shows a flowchart illustrating an embodiment of a method 10 of the disclosure for suppressing a distortion in a receive signal. The method 10 comprises the steps of;

obtaining 11 a receive signal comprising an information signal, the information signal occupying a first frequency band, the receive signal further comprising a pilot signal, the pilot signal occupying a second frequency band different from the first frequency band, extracting 13 the pilot signal from the receive signal to obtain an extracted pilot signal, combining 14 the receive signal and the extracted pilot signal to generate a distortion suppressed receive signal, using 15 the distortion suppressed receive signal as an output signal of the receiver.

According to an aspect, the step of combining 14 further comprises mixing the receive signal and the extracted pilot signal by multiplying the processed receive signal and the extracted pilot signal to generate the distortion suppressed receive signal.

According to an aspect, the step of extracting 13 further comprises filtering the receive signal by a pilot extraction filter arranged to suppress at least the first frequency band, and to pass at least the second frequency band, in order to obtain the extracted pilot signal from the receive signal.

According to an aspect, the method 10 also comprises the step of converting 12 the received signal by using a first mixing signal having a first mixing signal frequency to make the frequency band of the information signal comprised in the distortion suppressed receive signal coincide with the frequency band of the information signal comprised in the receive signal. According to an aspect, the step of extracting 13 further comprises removing a modulation of the extracted pilot signal to make a modulation removed extracted pilot signal, prior to the step of combining 14 the modulation removed extracted pilot signal by the receive signal to obtain the distortion suppressed receive signal.

Figure 11:
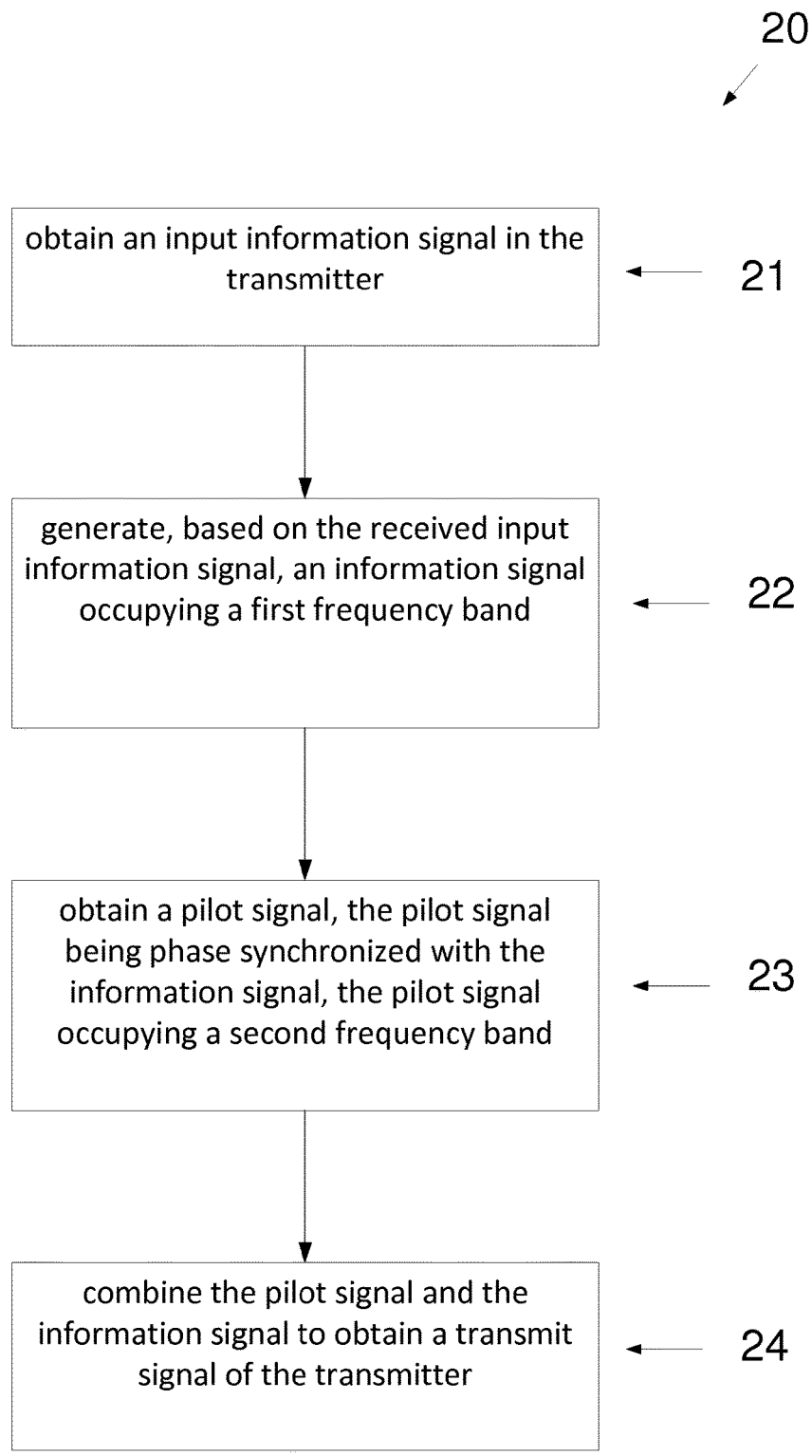

FIG. 11 shows a flowchart illustrating an embodiment of a method 20 of the disclosure for generating a transmit signal comprising an information signal and a pilot signal. The method 20 comprises the steps of;

obtaining 21 the input information signal in the transmitter, generating 22, based on the received input information signal, an information signal occupying a first frequency band, obtaining 23 the pilot signal, the pilot signal being phase synchronized with the information signal, the pilot signal occupying a second frequency band, combining 24 the pilot signal and the information signal to generate the transmit signal of the transmitter.

Figure 12:
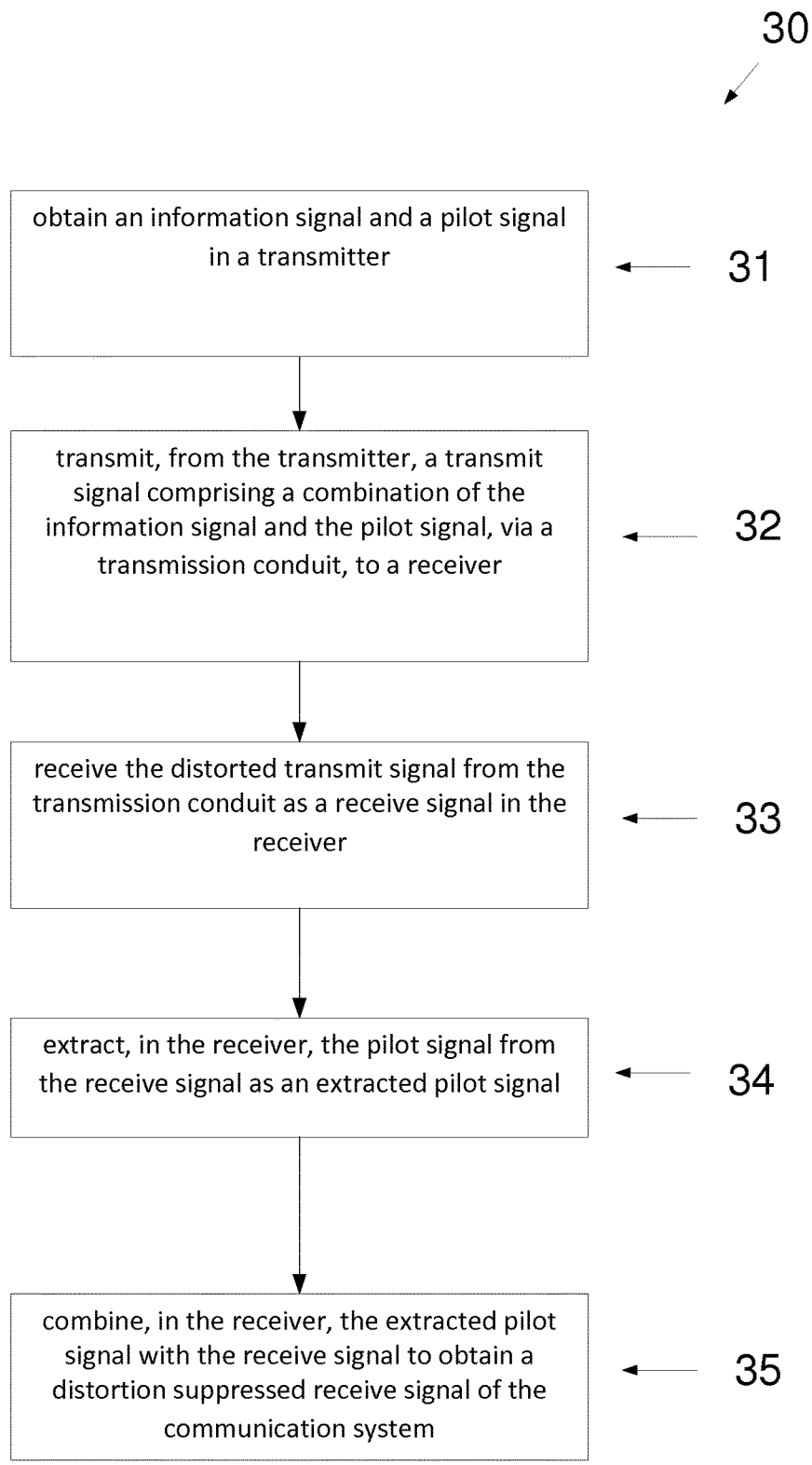

FIG. 12 shows a flowchart illustrating an embodiment of a method 30 of the disclosure, the communication system comprising a transmitter, a transmission conduit, and a receiver, the method 30 comprising the steps of;

obtaining 31 an information signal and a pilot signal in a transmitter, transmitting 32, from the transmitter, a transmit signal of the communication system comprising a combination of the information signal and the pilot signal, via a transmission conduit adding a distortion to the transmit signal, to the receiver, receiving 33 the distorted transmit signal from the transmission conduit as a receive signal in the receiver, extracting 34, in the receiver, the pilot signal from the receive signal as an extracted pilot signal, combining 35, in the receiver, the extracted pilot signal with the receive signal to obtain a distortion suppressed receive signal of the communication system.

According to an aspect, the step of obtaining 31 further comprises modulating the pilot signal by a pilot data signal, to provide a spectrally broadened pilot signal, and wherein the step of extracting 34 comprises removing said modulation of the pilot signal to obtain the extracted pilot signal.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method for suppressing distortion, the method comprising:

receiving a receive signal, the receive signal comprising an information signal that occupies a first frequency band and a pilot signal that occupies a second frequency band different from the first frequency band;

generating a processed receive signal based on the receive signal, the processed receive signal comprising a processed pilot signal and a processed information signal;

extracting the processed pilot signal from the processed receive signal as an extracted pilot signal;

generating a processed extracted pilot signal from the extracted pilot signal;

generating a distortion suppressed receive signal based on combining the processed extracted pilot signal with the processed receive signal, the distortion suppressed receive signal reducing an amount of distortion caused by either frequency conversion or a frequency error; and outputting the distortion suppressed receive signal as an output signal of the receiver.

2. The method of claim 1, further comprising obtaining a first mixing signal, the first mixing signal comprising a first mixing signal frequency configured to make the frequency band of the information signal comprised in the distortion suppressed receive signal coincide with the frequency band of the information signal comprised in the receive signal.

3. The method of claim 1, wherein combining the processed receive signal and the processed extracted pilot signal comprises multiplying the processed receive signal by the processed extracted pilot signal to generate the distortion suppressed receive signal.

4. The method of claim 1, wherein extracting the processed pilot signal comprises:
suppressing at least the first frequency band from the processed receive signal; and
passing at least the second frequency band from the processed receive signal.

5. The method of claim 1, wherein:
generating a processed extracted pilot signal comprises:
obtaining a pilot frequency conversion signal; and
multiplying the extracted pilot signal by the pilot frequency conversion signal to convert the frequency spectrum of the extracted pilot signal; and
generating the distortion suppressed receive signal comprises:
filtering the extracted pilot signal by a pilot filter; and
after filtering the extracted pilot signal, multiplying the processed extracted pilot signal by the processed receive signal.

6. The method of claim 1, wherein generating the processed extracted pilot signal comprises:
tracking the extracted pilot signal; and
suppressing wide-band additive noise in the processed extracted pilot signal.

7. The method of claim 6, wherein tracking the extracted pilot signal comprises applying at least one of a Kalman filter, a particle filter, and a Wiener filter to the extracted pilot signal.

8. The method of claim 1, wherein:
generating the processed extracted pilot signal comprises removing a modulation from the extracted pilot signal; and
generating the distortion suppressed receive signal comprises multiplying the processed extracted pilot signal by the processed receive signal after removing the modulation from the extracted pilot signal.

9. A method for suppressing distortion, the method comprising:
obtaining an input information signal;
generating an information signal based on the input information signal, wherein the information signal occupies a first frequency band;
obtaining a pilot signal, the pilot signal being phase synchronized with the information signal, wherein the pilot signal occupies a second frequency band different from the first frequency band;

combining the pilot signal and the information signal to facilitate distortion suppression, wherein the distortion suppressed comprises distortion caused by either frequency conversion or a frequency error; and generating a transmit signal based on the combined pilot signal and the information signal.

10. The method of claim 9, wherein:
obtaining the pilot signal comprises generating the pilot signal through a pilot generator;
generating the information signal comprises multiplying the input information signal by the pilot signal;
combining the pilot signal and the information signal comprises adding the information signal with the pilot signal such that pilot signal and the information signal are phase synchronized.

11. The method of claim 9, further comprising:
receiving a pilot data signal;
generating a spectrally broadened pilot signal carrying the pilot data signal, wherein generating the spectrally broadened pilot signal comprises modulating the pilot signal by the pilot data signal prior to combining the pilot signal and the information signal.

12. A method for suppressing distortion, the method comprising:
receiving an input information signal;
generating an information signal based on the input information signal;
obtaining a pilot signal;
generating a transmit signal, the transmit signal comprising the pilot signal and the information signal;
receiving a second transmit signal;
generating a distorted transmit signal, wherein generating the distorted transmit signal comprises adding a distortion to the second transmit signal;
receiving a second distorted transmit signal as a receive signal;
extracting a second pilot signal from the receive signal as an extracted pilot signal;
processing the extracted pilot signal to generate a processed extracted pilot signal; and
combining the processed extracted pilot signal with the receive signal to obtain a distortion suppressed receive signal, the distortion suppressed receive signal reducing an amount of distortion caused by either frequency conversion or a frequency error.

13. The method of claim 12 wherein:
the second transmit signal is the transmit signal;
the second distorted transmit signal is the distorted transmit signal; and
the second pilot signal is the pilot signal.

14. A receiver arranged to suppress distortion, the receiver comprising:
a front end unit configured to:
receive a receive signal comprising an information signal occupying a first frequency band and a pilot signal occupying a second frequency band different from the first frequency band; and
generate a processed receive signal based on the receive signal, the processed receive signal comprising a processed pilot signal and a processed information signal;
a pilot removal device configured to receive the processed receive signal, the pilot removal device comprising:
a pilot extractor unit configured to extract the processed pilot signal from the processed receive signal as an extracted pilot signal, a pilot processor unit configured to generate a processed extracted pilot signal from the extracted pilot signal; and a compensator unit configured to combine the processed extracted pilot signal with the processed receive signal to generate a distortion suppressed receive signal, the distortion suppressed receive signal reducing an amount of distortion caused by either frequency conversion or a frequency error;

wherein the pilot removal device is further configured to output said distortion suppressed receive signal as an output signal of the receiver.

15. The receiver of claim 14, wherein the pilot extractor unit comprises a pilot extraction filter configured to suppress at least the first frequency band, and to pass at least the second frequency band, in order to obtain the extracted pilot signal from the processed receive signal.

16. The receiver of claim 14, wherein the pilot processor unit further comprises a pilot post-processing unit configured to:

obtain a pilot frequency conversion signal;

multiply the extracted pilot signal by the pilot frequency conversion signal to convert the frequency spectrum of the extracted pilot signal to a processed extracted pilot signal;

filter the extracted pilot signal by a pilot filter; and after filtering the extracted pilot signal, multiplying the processed extracted pilot signal by the processed receive signal to generate the distortion suppressed receive signal.

17. The receiver of claim 14, wherein the pilot processor unit further comprises a tracking filter configured to track the extracted pilot signal to generate the processed extracted pilot signal and to suppress wide-band additive noise in the processed extracted pilot signal, wherein the tracking filter comprises at least one of a Kalman filter, a particle filter, and a Wiener filter.

18. The receiver of claim 14, wherein the pilot processor unit further comprises a modulation removal unit configured to remove a modulation from the extracted pilot signal to generate a processed extracted pilot signal.

19. A transmitter arranged to suppress distortion, the transmitter comprising:

a receiver configured to:

obtain an input information signal; and generate an information signal based on the input information signal, the information signal occupying a first frequency band;

a pilot addition device configured to:

obtain the pilot signal, the pilot signal occupying a second frequency band different from the first frequency band and being phase synchronized with the information signal;

combine the pilot signal and the information signal to facilitate distortion suppression, wherein the distortion suppressed comprises distortion caused by either frequency conversion or a frequency error; and generate the transmit signal of the transmitter.

20. The transmitter of claim 19, wherein the pilot addition device further comprises a modulator configured to modulate the pilot signal by a pilot data signal prior to combining the modulated pilot signal and the information signal to obtain the transmit signal, the modulation providing a spectrally broadened pilot signal carrying the pilot data signal.

* * * * *